Oct. 14, 1930.　　　F. M. BOSWORTH　　　1,778,581
DRAINAGE CONTROL
Filed Oct. 1, 1928

Patented Oct. 14, 1930

1,778,581

UNITED STATES PATENT OFFICE

FREDERIC M. BOSWORTH, OF CLEVELAND, OHIO, ASSIGNOR TO THE SWARTWOUT COMPANY, OF CLEVELAND, OHIO, A CORPORATION OF OHIO

DRAINAGE CONTROL

Application filed October 1, 1928. Serial No. 309,438.

This invention relates to steam traps and more particularly to the control of the discharge of condensate from the trap and to starting the operation of the trap.

I am familiar with the steam trap disclosed in the copending application of Joseph M. Barrett, Serial No. 144,815, filed October 28th, 1926, and my present invention constitutes an improvement over the Barrett invention. It is among the objects of my invention to provide a continuously acting trap in which, in normal operation, condensate may be maintained at a certain water level preventing the escape of steam therefrom, and which will be self-draining when the inflow of steam and condensate ceases. Another object is to arrange the controlling apparatus for the trap in such a manner that the trap will come into operation very quickly after the initial inflow of steam. A further object is to reduce to a minimum the loss of steam which is incidental in starting the trap. A further object is to eliminate the hazard of "air binding" in starting the trap or in its operation.

Other objects will appear from the following description of a preferred form of my invention, reference being had to the accompanying drawings. The essential characteristics are summarized in the claims.

Figure 1:
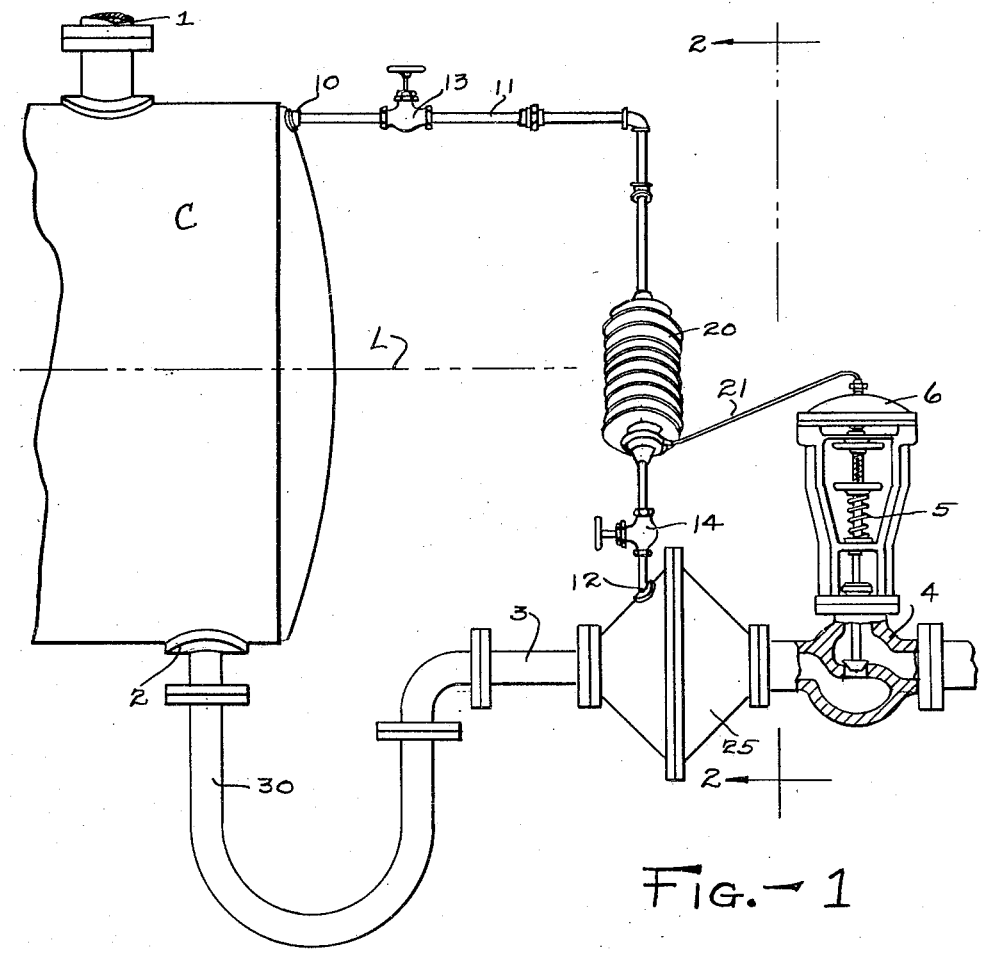
Figure 2:
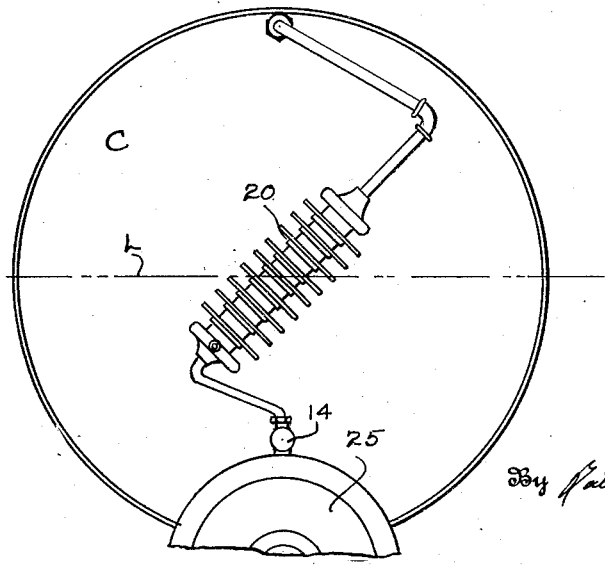

In the drawings, Fig. 1 is an elevation of the assembled parts comprising the trap and the control mechanism therefor; and Fig. 2 is an elevation taken along the line 2—2 of Fig. 1.

Referring particularly to Fig. 1, the trap comprises essentially a container C in which in normal operation it is desired to maintain the water level in the plane of the line L. The container has an inlet 1 and a lower or main outlet 2. Leading from the outlet 2 is a discharge pipe 3, the flow through which is controlled by the valve 4. The valve may conveniently be of the pressure actuated type, which in the absence of pressure, is maintained in open position by a spring 5 and which is closed by the exertion of fluid pressure in the diaphragm chamber 6.

Near the top of the container C and communicating with the steam space thereof, is an outlet 10 which communicates with the conduit 11, which conduit joins the discharge pipe at 12. Hand valves 13 and 14 are provided to control the flow through the conduit.

Mounted in the conduit and comprising a part thereof, is a pressure generator, which may be similar to the well known Copley generator, and which may be described briefly as comprising a closed cylinder containing an expansible fluid which is more or less gasified under pressure depending upon the heat content of the fluid in the conduit within the said cylinder. The conduit 21 leads from the generator to the diaphragm chamber 6 of the valve 4 and pressure is exerted in the diaphragm chamber according to the water level in the container and the water level in the conduit 11 in a well known manner.

Referring also to Fig. 2, it is preferable that the generator be inclined from the vertical so that within limits, the sensitiveness of the water regulation may be adjusted. In the usual operation of the trap, the water level is maintained along the plane of the line L, and if the water level tends to fall below that line, additional steam will come down within the generator to increase the pressure, thus tending to close the valve 4 and retard the discharge until the water level rises.

In the usual operation of the trap, the rate of outflow of water through the discharge pipe 3 might tend to vary the elevation of the water in the conduit 11, with the result that the action of the generator 20 and the valve 4 might be influenced by the rate of discharge of water from the trap. To eliminate this hazard for all practical purpose, I provide a surge chamber 25 at the point in the discharge line where the conduit 11 enters the discharge line, so that the variation in the rate of flow in the discharge pipe will have little or no effect upon the level of the water in the conduit 11.

As mentioned above, when the inflow of steam ceases, the generator 20 will necessarily be cooled, permitting the spring 5 to open the valve 4 and cause the trap to be drained. A subsequent inflow of steam would ordinarily tend to pass through the trap by way of the conduit 11 and the discharge pipe 3 until that portion of the steam which flowed through the conduit 11 had warmed the generator and closed the valve. Whereupon the valve would be held closed until the condensate rose in the generator and reduced the temperature and pressure. Thus in starting the trap, a considerable amount of steam might flow through the discharge pipe before the generator was warmed, with the result that a substantial waste of steam would take place.

My invention has for one of its objects the reduction of this loss by inserting in the discharge pipe a U trap 30 which will close the discharge line to any outflowing steam and direct all of the initial steam through the conduit 11 so that all of the steam leaving the trap will flow through the conduit 11 and warm the generator to close the valve, thus bringing the trap into effective operation with great rapidity.

It will be understood that I do not care to be limited specifically to the U trap 30 but I conceive that the essence of this phase of the invention lies in keeping the discharge line closed to steam and then collecting condensate to a desired level and thereafter using the discharge line for the condensate.

From the foregoing it will appear that my invention consists in a simple arrangement of parts, all rugged, durable and susceptible to long life; that by reason of the direct connection of the conduit 11 from the steam space of the container to the discharge line and by reason of the conduit 11 providing the only path of escape for steam that the hazard of "air binding" is eliminated; that the starting of the trap from an empty and idle condition to its normal running position be very rapid; and that during the operation of the trap the desired water level will not be affected by changes in the rate of flow of condensate.

While I have illustrated and described a preferred form of my invention including specific details of construction, I do not care to be limited in the scope of my patent in that or any manner other than by the claims appended hereto.

I claim:—

1. A steam trap having an upper and lower outlet, a valve for controlling the outflow from both outlets, means for preventing the escape of steam from the lower outlet, and means for discharging water through the lower outlet according to the water level in the trap.

2. A steam trap having an upper and lower outlet, a valve for controlling the outflow from both outlets, means for preventing the escape of steam from the lower outlet and for directing steam through the upper outlet, and means for discharging water through the lower outlet according to the water level in the trap.

3. A steam trap having an upper and lower outlet, a valve for controlling the outflow from the lower outlet, means for preventing the escape of steam from the lower outlet, and means disposed in the path of steam flowing from the upper outlet for controlling said valve and regulating the flow of water through the lower outlet according to the water level in the trap.

4. A steam trap having an upper and a lower outlet, conduits leading from both outlets, valve means for controlling the outflow through said conduits, means associated with one conduit for preventing the outflow of steam therethrough, and means associated with the other conduit for controlling said valve means and regulating the outflow of all fluid from said trap.

5. A steam trap having an upper and a lower outlet, conduits leading from both outlets, valve means for controlling the outflow through said conduits, means associated with one conduit for preventing the outflow of steam therethrough and for directing outflowing steam through the other conduit, and means comprising a fluid pressure generator actuable in response to changes in the heat content or temperature of the fluid in the latter conduit and associated with the latter conduit for controlling said valve means and regulating the outflow of all fluid from said trap.

6. A steam trap having an upper and a lower outlet, conduits leading from both outlets, valve means for controlling the outflow through said conduits, means comprising a U-trap associated with one conduit for preventing the outflow of steam therethrough and means associated with the other conduit controlling said valve means and regulating the outflow of water through the first named conduit.

7. The combination of a container for water and steam, a discharge pipe having a U trap, a valve in said pipe positioned beyond said U trap, a conduit leading from the steam space of the container to the discharge pipe at a point between the U trap and the valve, and thermo-responsive means associated with said conduit for regulating said valve.

8. The combination of a container for water and steam, a discharge pipe having a U trap and a surge chamber, a valve in said pipe positioned beyond the U trap and said chamber, a conduit leading from the steam space of the container to the surge chamber at a point between the U trap and the valve, and thermo-responsive means associated with said conduit for regulating said valve.

9. The combination of a container for water and steam, a discharge pipe having a U trap, a valve in said pipe positioned beyond said U trap, a conduit leading from the steam space of the container to the discharge pipe at a point between the U trap and the valve, and thermo-responsive means associated with said conduit in the plane of normal water level of the container for regulating said valve.

10. The combination of a container for water and steam, a discharge pipe therefor, a valve in said pipe, a conduit leading from the steam space of the container to the discharge pipe through which the flow of steam is controlled by said valve, and means associated with the discharge pipe for causing all of the steam which leaves the container to flow through the conduit to the exclusion of said pipe.

11. The combination of a container for water and steam, a discharge pipe therefor, a valve in said pipe, a conduit leading from the steam space of the container to the discharge pipe through which the flow of steam is controlled by said valve, and means for causing all of the steam which leaves the container to flow through the conduit to the exclusion of said pipe.

12. The combination of a container for water and steam, a discharge pipe therefor, a valve in said pipe, a conduit leading from the steam space of the container to the discharge pipe through which the flow of steam is controlled by said valve, thermo-responsive means associated with the conduit for actuating said valve, and means associated with the discharge pipe for causing all of the steam which leaves the container to flow through the conduit to the exclusion of said pipe.

13. A steam trap having outlets at different elevations, a conduit leading from one of said outlets, thermo-responsive means associated with said conduit and operative in response to the temperature or heat content of the fluid passing through the conduit, valve means for regulating the outflow from the trap and actuable in response to said thermo-responsive means, and means for directing the outflow of all of the steam from the trap through said conduit and all of the outflow of water through the other of said outlets.

14. A steam trap having outlets at different elevations, a conduit leading from the higher of said outlets, thermo-responsive means associated with said conduit and operative in response to the temperature or heat content of the fluid passing through the conduit, valve means for regulating the outflow from the trap and actuable in response to said thermo-responsive means, and means for directing the outflow of all the steam from the trap through said upper outlet and all of the outflow of water through the lower of said outlets.

15. A steam trap having outlets at different elevations between which the normal water level in the trap is maintained, a conduit leading from the upper of said outlets, thermo-responsive means associated with said conduit at the water level in the trap and operative in response to the temperature or heat content of the fluid passing through the conduit, valve means for regulating the outflow from the trap and actuable in response to said thermo-responsive means, a discharge pipe leading from the lower outlet, and means for directing the outflow of all the steam from the trap through said conduit and all of the outflow of water through said pipe.

In testimony whereof, I hereunto affix my signature.

FREDERIC M. BOSWORTH.